March 11, 1952     M. W. ALDE     2,589,030
HELICOPTER ROTOR SYSTEM
Filed April 26, 1949     3 Sheets-Sheet 1

Inventor
Murray William Alde
Per L. J. Mitchell
Attorney

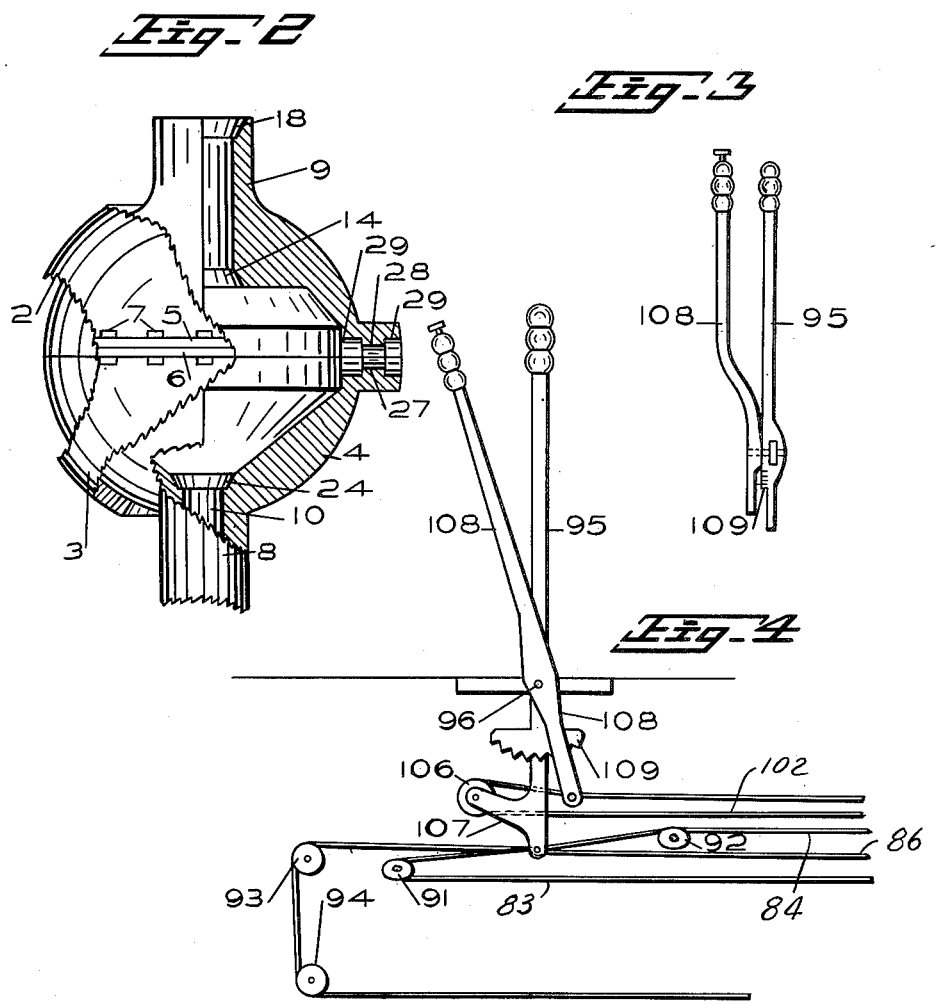

March 11, 1952  M. W. ALDE  2,589,030
HELICOPTER ROTOR SYSTEM
Filed April 26, 1949  3 Sheets-Sheet 3
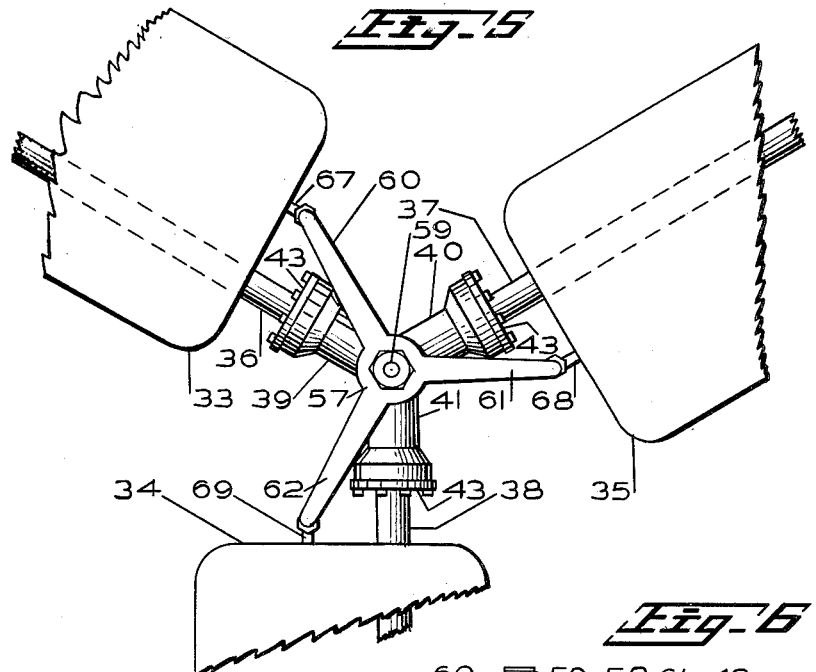
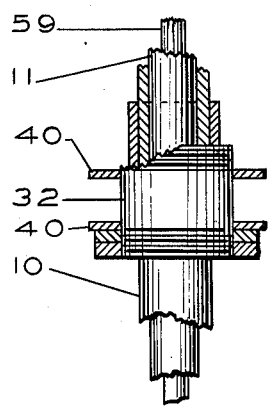
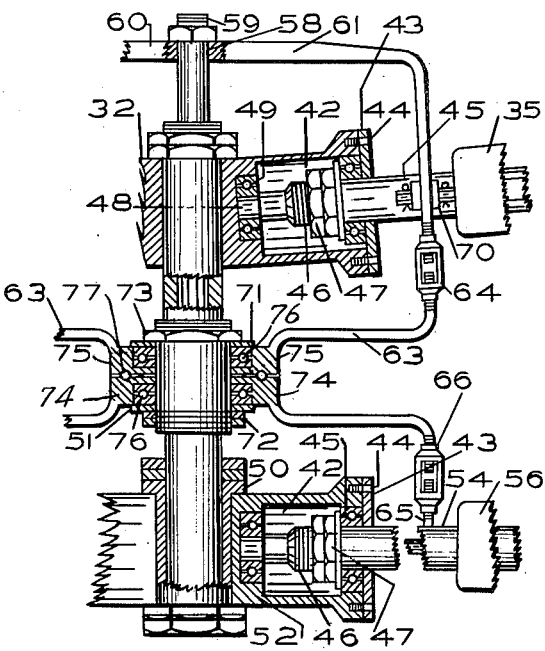
Inventor
Murray William Alde
Per L. A. Mitchell
Attorney Patented Mar. 11, 1952

2,589,030

UNITED STATES PATENT OFFICE 2,589,030

HELICOPTER ROTOR SYSTEM

Murray William Alde, Beaver Lodge, Alberta, Canada

Application April 26, 1949, Serial No. 89,597

4 Claims. (Cl. 244—17.23)

My invention relates to helicopters, more particularly having reference to an improved rotor unit.

In the art to which the invention relates, helicopters more usually employ long narrow blades, requiring to be operated at comparatively high speeds. The present invention contemplates provision of an improved rotor unit capable of using wider blades than normally employed.

One of the objects of the invention is accordingly to provide an improved rotor unit for helicopters designed for operation of blades travelling at comparatively low speeds and employing a greater blade surface with resultant improvement in the control and stability of the machine.

A further object of the invention is to provide an improved mounting for the unit that permits tilting the unit, and including variable pitch means for the blades.

Other features and advantages of the invention will become apparent by reference to the accompanying description taken in conjunction with the drawings wherein like characters of reference indicate like parts throughout the several views and wherein:

Fig. 2 shows a side view partly in section and broken away of the rotor body and mounting therefor.

Fig. 3 is a side edge view of the rotor control levers.

Fig. 4 shows a side view of the rotor control levers with cables connecting thereto.

Fig. 5 is a top plan view showing the rotor blade mounting, with fragments of the blades and arms on which the blades are mounted.

Fig. 6 is a detail side view, partly in section, showing the mounting for the rotor blades and the variable pitch control connections.

Fig. 7 is a detail fragment illustrating the assembly of shafts and pitch control mounting, shown broken away and sectioned in part.

Figure 1:
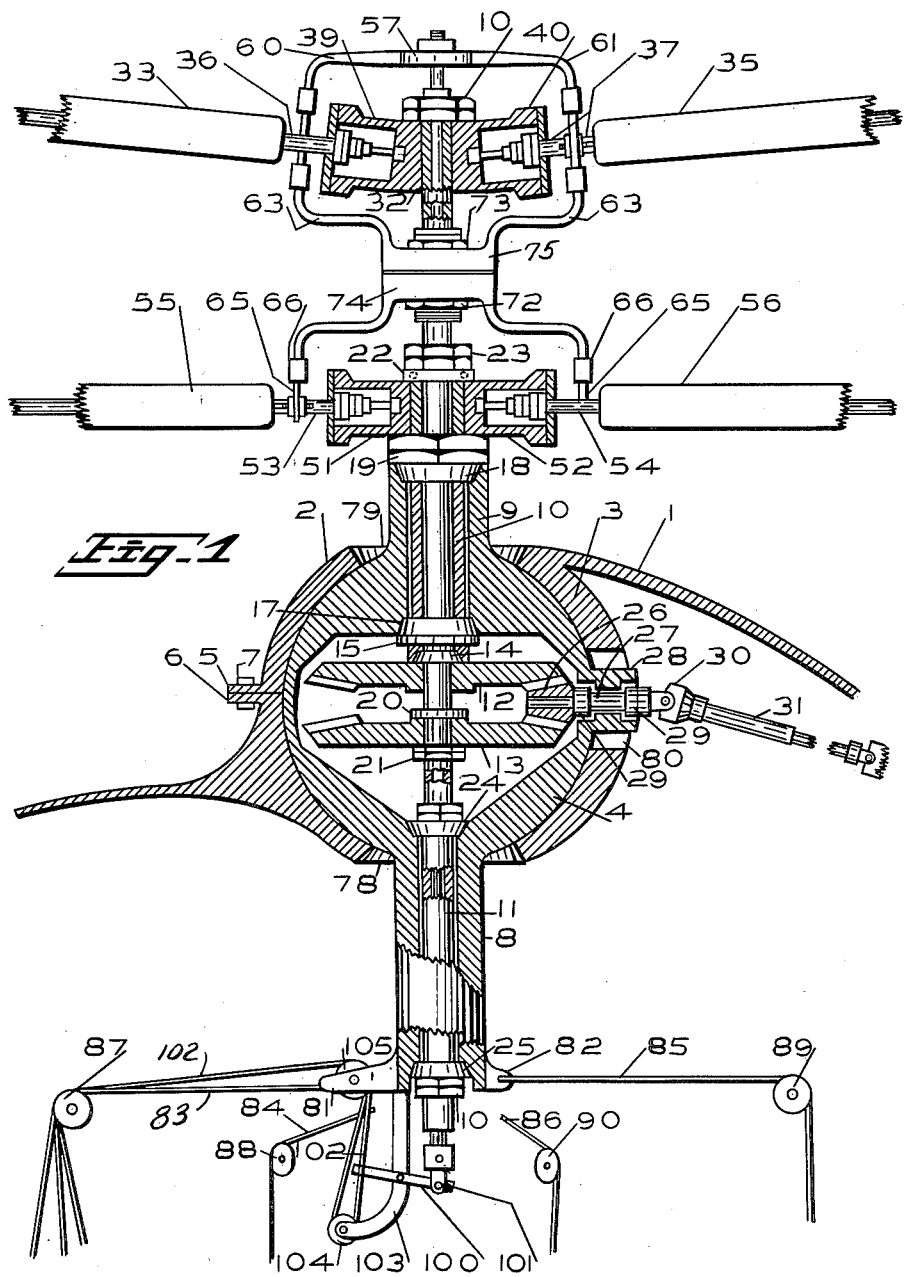
Fig. 1 is a side view of the rotor unit assembled and shown mounted in the body of the helicopter, the showing being partly broken away and partly in section.

Having reference to the drawings I indicates the body or fuselage of the helicopter which, for the purpose of the present invention provides mating halves 2 and 3 forming a casing for the body 4 of the rotor, the casing halves having flanges 5 and 6 by which the casing may be assembled and connected by bolts 7.

The body 4 of the rotor is spherical and free to turn in the rotor casing, and includes a depending stem portion 8 and an upper or head portion 9, in which is mounted for rotation the rotor shafts. There are two such shafts, hollow and concentrically mounted, an outer shaft 10 and an inner shaft 11.

The shafts 10 and 11 are driven by gears 12 and 13 respectively fixed thereto. The gear 12 is loose on the shaft 11, to permit rotation of the shaft therein, a bearing being provided at 14, and the gear is fixed to the lower end of the shaft 10 by a collar 15 welded to said shaft.

The shaft 10 is mounted for rotation in bearing members 17 and 18 carried in the body 4 and its upper portion 9, the bearing member 18 being secured by a lock nut 19.

The gear 13 is fixed to the shaft 11 between a collar 20 welded on the shaft and lock nuts 21. This shaft 11 is mounted to rotate in an upper bearing member 22 secured by a lock nut 23, intermediate bearing members 14 and 24, and a lower bearing member 25, in all of which ball bearings are used.

The gears 12 and 13 are driven oppositely by a pinion 26 on a driven shaft 27 mounted to rotate in an offset 28 of the body 4 and for which roller bearings at 29—29 are provided. The shaft 27 connects by a universal coupling 30 with a shaft 31 to be driven from a source of power within the helicopter.

On the inner shaft 11 is fixed a hub 32 on which are carried the upper blades 33, 34 and 35. For mounting the blades I provide arms 36, 37 and 38, each mounted in a radial hub portion 39, 40 and 41 respectively. The mounting of the arms is similar, each of the radial hub portions providing an open end, as at 42 (see Figure 6) in which the end of an arm is mounted. For this the radial hub portion has a plate 43, fixed thereto by bolts 44, and in which the arm is received and is rotatable in a bearing race 45, the arm being threaded at 46 for a lock nut 47 that holds the bearing race against the plate 43. The arm further provides a reduced end 48 receivable in a bearing race 49 carried in the body of the hub.

On the shaft 10 is mounted a similar hub 50 fixed thereto, with three radial hub portions as in the upper blade mountings, said hub portions being as indicated by numerals 51 and 62, Figures 1 and 6, and mounting arms, as indicated by numerals 53 and 54, carrying blades, as at 55 and 56; it being understood three such arms with blades would be provided as in the upper blades and mounting therefor, the full showing being omitted for convenience of illustration. Further the mounting for each arm would be the same as for the upper arms, and to which similar reference characters have been applied.

A pitch control for the arms is applied by means of a spider 57 fixed on the splined end 58 of a rod 59 mounted free to slide in the bore of the inner shaft 11. The spider 57 provides three arms 60, 61 and 62, one for each of the blades 33, 34 and 35, and an extension 63 for each arm attached thereto by a coupling 64, and to which extension a link 65 is attached by a coupling 66 for engagement with the lower blades 55, 56, etc. Each of the arms 33, 34 and 35 is thus extended to activate the blades carried by the hub 50 on shaft 10.

The blades 33, 34 and 35 are mounted to turn on their arms 36, 37 and 38, and similarly the blades 55, 56 etc., are mounted to turn. The connection between the arms 60, 61 and 62 and the blades 33, 34 and 35, is by rods 67, 68 and 69, respectively attached to the blades 33, 34 and 35, and in each instance coupled thereto by a clamp 70, by which means sliding the rod 59 endwise in the shaft 11 causes the blades to turn.

Similarly the extensions 63 of the spider arms and links 65 would be connected to turn the blades 55, 56 etc., carried by the shaft 10. For mounting the extensions 63 I provide a sleeve 71 free to slide on the shaft 11. Rotatable on the sleeve 71 are two blocks 74 and 75 mounted between a plate 72 fixed to said sleeve and a lock nut 73 threaded thereon, ball bearing races, as at 76 and 77, being provided by which said blocks may turn on the sleeve 71 and oppositely in respect to each other.

The body 4 of the rotor assembly may revolve within the casing formed by the casing halves 2 and 3 to an amount limited by enlarged openings 78 and 79 respectively provided for the body stem portion 8 and head portion 9, a further similar enlarged opening 80 being provided for the extension 28 of the body 4.

To turn the rotor assembly within the limits of movement of the body 4 I provide ears, as at 81 and 82, (four being provided at quarterly intervals) for engagement of four cables 83, 84, 85 and 86, carried respectively over sheaves 87, 88, 89, and 90; and over further sheaves as at 91, 92, 93 and 94, (Figure 4) for attachment to a lever 95 mounted for universal tilting at 96 convenient to the operator.

Further for actuation of the pitch control rod 59 I provide a lever arm 100 pivoted on a bearing coupling 101 on the lower end of rod 59 and mounted with the rod free to turn therein.

The lever arm 100 is engaged by a cable 102 and is pivoted on a depending arm 103 carrying a pulley wheel 104 over which the cable 102 is passed, the cable being fixed to the lever arm 100.

The cable 102 is carried over the sheave 105 in the ear 81 and then over the sheave at 87 and over a further sheave 106 (see Figure 4) on an arm 107 of lever 95, and is engaged by a lever 108 pivoted on the lever 95, the lever 108 being adapted to be set in a selected position of adjustment by a quadrant 109.

In the operation of the device power applied through shaft connection 31 rotates shaft 27 to turn gears 12 and 13 and rotate the concentric shafts 10 and 11 which carry the upper arms 36, 37 and 38 with attached blades, and the lower arms 53, 54, etc. For tilting the assembly the lever 95 is used operating through its four cable connections 83, 84, 85 and 86 to shift the assembly.

For varying the pitch of the blades the rod 59 is used actuated by the lever arm 100 to raise or lower said rod, the arm 100, by cable 102, being actuated by the lever 108. Raising or lowering the rod 59 by the spider 57 and spider arms 60, 61 and 62, and extensions 63 thereof turn the blades 33, 34 and 35 on their arms and similarly the lower blades 55, 56, etc.

While I have herein disclosed a preferred embodiment of my invention, changes in the construction and arrangement of parts would be permissible, and in so far as such changes come within the spirit and scope of the invention as defined in the appended claims they would be considered a part hereof.

What I claim and wish to secure by Letters Patent is:

1. In a helicopter a fuselage, a casing formed integral with the fuselage, a spherical body mounted to revolve within the casing, said body including stem and head portions and an extension portion, the casing providing enlarged openings for said stem, head and extension portions, a hollow shaft mounted for rotation in the head portion of said body, a further shaft mounted for rotation in the stem of said body and concentrically within the first named shaft, opposing gears fixed to said shafts, a driven shaft mounted to rotate in the body extension, said shaft being adapted for connection to be driven from a source of power, and a pinion on the driven shaft meshing with and adapted to drive the opposing gears oppositely.

2. A device as defined in claim 1 in which said further shaft is hollow and including a rod mounted to slide endwise therein, hubs on each of the hollow shafts, a trio of radial hub portions on each of said hubs, arms carried by said hub portions, blades on the arms free to turn, a spider on said rod, said spider including a trio of arms, extensions for said arms and means connecting said arms and extensions to the blades adapted when said rod is moved endwise in the concentrically mounted inner shaft to turn said blades.

3. In a helicopter providing a fuselage, a casing formed integral with the fuselage, a spherical body mounted to revolve within the casing, said body including a depending stem portion and an upstanding head portion and further including a lateral extension, the casing providing enlarged openings for said stem and head portions and lateral extension, a hollow shaft mounted for rotation in said body and head portion thereof, a further hollow shaft mounted for rotation in the first named shaft and the stem of said body, means connectable to a source of power for driving said shafts oppositely said means including a driven shaft mounted rotatable in the lateral extension of the spherical body, a hub on each of the hollow shafts, said hubs including radial portions, arms carried by the radial portions of said hubs, blades mounted to turn on the arms, a rod endwise slidable within the second named hollow shaft, a spider fixed on said rod, said spider including arms, and means connecting the arms on said spider and said blades whereby endwise sliding of the rod causes the blades to turn on the arms carried by the radial portions of the hub.

4. A device as described in claim 3 and including cables connected to the stem of said body, said cables being adapted to turn the body within the fuselage casing, an operating lever pivotally mounted in the fuselage and to which the cables connect, and means mounting the cables to be actuated by said lever to turn said body.

MURRAY WILLIAM ALDE.

REFERENCES CITED

The following references are of record in the file of this patent:

UNITED STATES PATENTS

| Number | Name | Date |
|---|---|---|
| 1,189,680 | Gardner | July 4, 1916 |
| 1,294,361 | Nash | Feb. 11, 1919 |
| 2,404,014 | Thornes | July 16, 1946 |
| 2,434,276 | Laskowitz | Jan. 13, 1948 |
| 2,437,165 | Locke | Mar. 2, 1948 |
| 2,481,748 | Hiller | Sept. 13, 1949 |

FOREIGN PATENTS

| Number | Country | Date |
|---|---|---|
| 198,878 | Switzerland | Jan. 2, 1939 |
| 538,621 | Great Britain | Aug. 11, 1941 |